United States Patent Office 2,901,479
Patented Aug. 25, 1959

2,901,479
PROCESS FOR THE PRODUCTION OF NEW VAT DYESTUFFS

Fritz Baumann, Leverkusen-Bayerwerk, and Hans-Samuel Bien, Leverkusen, Germany, assignors to Farbenfabriken Bayer Aktiengesellschaft, Leverkusen, Germany, a corporation of Germany No Drawing. Application May 18, 1956
Serial No. 585,607

11 Claims. (Cl. 260—247.1)

This invention relates to new vat dyestuffs of the anthraquinone series.

It is an object of the present invention to provide new valuable vat dyestuffs which dye cotton in olive green shades. A further object is to provide dyestuffs which exhibit excellent fastness properties. Further objects will appear hereinafter.

These objects are attained in accordance with the present invention by introducing into the dyestuffs which may be obtained from Bz 1-benzanthronylamino-dianthrimides by condensation with aluminium chloride complex compounds, or from Bz 1- benzanthronylamino-dianthrimide carbazoles by condensation with alcoholic potassium hydroxide, sulphonic acid chloride groups, and by reacting the latter with ammonia or primary or secondary organic bases.

The dyestuffs used as starting material for the process according to the present invention may be obtained, for example, according to the process described in our copending United States patent specification Serial No. 520,621, filed July 7, 1955 (now Patent No. 2,805,224), by treating Bz 1-benzanthronylamino-1,1'-dianthrimides at elevated temperature, e.g. 120° C. with a complex compound which is obtained by reacting aluminium chloride and a base such as pyridine, quinoline or dimethyl aniline, or by condensation of Bz 1-benzanthronylamino-dianthrimide carbazoles with alcoholic potassium hydroxide. The conversion of these dyestuffs into the sulphonamides may be effected in usual manner by treating them with chlorosulphonic acid in the presence or absence of phosphorus pentachloride or thionyl chloride, and subsequent reaction with ammonia or primary or secondary organic bases such as monomethyl-amine, dimethyl-amine, morpholine, piperidine, 1,2,3,4-tetrahydroquinoline or aniline.

The dyestuffs obtained according to the new process exhibit compared with the dyestuffs used as starting materials a shade strongly shifted to green, from khaki for instance to olive green, while the vat dyestuffs containing sulphonamide groups as described in German patent specification No. 655,591 have a dyeing effect only a little more blue than the nonsulphonated product. The new vat dyestuffs obtained according to the process of the present invention are, moreover, far superior in their wet-fastness to those described in German patent specification No. 655,591.

The following examples are given for the purpose of illustrating the invention.

Example 1

6.7 grams of a dyestuff prepared according to the process described in Example 1 of our copending U.S. patent specification Ser. No. 520,621 are dissolved in 35 millilitres of chloro-sulphonic acid at 20–30° C. After the sulphochlorination is completed, the melt is placed on ice, filtered off by suction and washed to neutral reaction. For the further reaction, the moist filter cake is stirred with 100 millilitres of 30 percent dimethylamine solution at room temperature for a few hours, the suspension is heated to 80° C. for some time and to the boil for a brief period. The sulphodimethyl amide thus formed is filtered off by suction and, if necessary, washed with 30 percent pyridine water in order to remove the sulphonic acid. The dyestuff obtained in a very good yield dissolves in concentrated sulphuric acid with a blue colour and dyes cotton in olive-green shades of very good fastness properties.

Instead of dimethylamine there may also be used monomethylamine, piperidine, morpholine, 1,2,3,4-tetrahydroquinoline or ammonia. The dyestuffs thus obtained possess similar very fast shades.

Similar results are obtained by using instead of the above dyestuff the dyestuff which is obtained according to the process described in Example 6 of the copending U.S. patent specification Ser. No. 520,621 by an alcoholic alkali metal melt of Bz 1 - benzanthronyl-5-imino-1,1'-dianthrimid carbazoles.

Example 2

6.7 grams of the dyestuff of the preceding example are heated in a mixture of 67 millilitres of chlorosulphonic acid and 6.7 grams of phosphorus pentachloride or 2 cc. of thionyl chloride to 60° C. for 2 hours. After cooling, the mixture is placed on ice, filtered off by suction and washed to neutral reaction. The moist filter cake is then evaporated to dryness with 100 millilitres of 60 percent dimethylamine solution. In order to remove the salts thereby formed, the residue is boiled out twice with water. The dyestuff obtained in quantitative yield dissolves in sulphuric acid with a reddish blue colour, dyeing cotton in very fast yellowish olive-green shades.

Instead of dimethylamine there may also be used monomethylamine, piperidine, morpholine, 1,2,3,4-tetrahydroquinoline or ammonia. The dyestuffs thus obtained possess similar very fast shades.

We claim:

1. A dyestuff which is obtained by treating a member selected from the group consisting of dyestuffs formed by (a) condensing a Bz 1-benzanthronylamino-5-amino-1,1'-dianthrimide with a complex compound of aluminum chloride and a base of the group consisting of amines and ammonia and (b) by condensing a Bz 1-benzanthronyl-5-amino-1,1'-dianthrimide carbazol with alcoholic potassium hydroxide, with chlorosulphonic acid at an elevated temperature and reacting the compound thus obtained with an excess of a member selected from the group consisting of ammonia, monomethyl amine, dimethyl amine, piperidine, morpholine, 1,2,3,4-tetrahydroquinoline and aniline at a temperature up to about 100° C.

2. A dyestuff which is obtained by treating a dyestuff formed by condensing a Bz 1-benzanthronyl-5-amino-1,1'-dianthrimide with a complex compound of aluminum chloride and a base of the group consisting of amines and ammonia, with chlorosulphonic acid at an elevated temperature, reacting the compound thus obtained with an excess of dimethyl amine at a temperature up to about 100° C. and recovering the dyestuff formed.

3. A dyestuff which is obtained by treating a dyestuff formed by condensing a Bz 1-benzanthronyl-5-amino-1,1'-dianthrimide with a complex compound of aluminum chloride and a base of the group consisting of amines and ammonia, with chlorosulphonic acid at an elevated temperature, reacting the compound thus obtained with an excess of piperidine at a temperature up to about 100° C. and recovering the dyestuff formed.

4. A dyestuff which is obtained by treating a dyestuff formed by condensing a Bz 1-benzanthronyl-5-amino-1,1'-dianthrimide with a complex compound of aluminum chloride and a base of the group consisting of amines and ammonia, with chlorosulphonic acid at an elevated temperature, reacting the compound thus obtained with an excess of morpholine at a temperature up to about 100° C. and recovering the dyestuff formed.

5. A dyestuff which is obtained by treating a dyestuff formed by condensing Bz 1-benzanthronyl-5-amino-1,1'-dianthrimide with a complex compound of aluminum chloride and a base of the group consisting of amines and ammonia, with chlorosulphonic acid at an elevated temperature, reacting the compound thus obtained with an excess of 1,2,3,4-tetrahydroquinoline at a temperature up to about 100° C. and recovering the dyestuff formed.

6. A process for the production of new vat dyestuffs which comprises treating a member selected from the group consisting of the dyestuffs which may be obtained by condensing Bz 1 - benzanthronyl - 5 - amino-1,1'-dianthrimides with a complex compound of aluminium chloride with a base of the group consisting of amines and ammonia and by condensing Bz 1-benzanthronyl-5-amino-1,1'-dianthrimide carbazols with alcoholic potassium hydroxide, with chlorosulphonic acid at an elevated temperature and reacting at a temperature up to about 100° C. the compound thus obtained with an excess of a member selected from the group consisting of ammonia, monomethyl amine, dimethyl amine, piperidine, morpholine, 1,2,3,4-tetrahydroquinoline and aniline.

7. The process as claimed in claim 6, wherein the treatment with chlorosulphonic acid is carried out in the presence of a member selected from the group consisting of phosphorus pentachloride and thionylchloride.

8. A process for the production of new vat dyestuffs which comprises treating a member selected from the group consisting of the dyestuffs which may be obtained by condensing Bz 1 - benzanthronyl - 5 - amino-1,1'-dianthrimides with a complex compound of aluminium chloride with a base of the group consisting of amines and ammonia and by condensing Bz 1-benzanthronyl-5-amino-1,1'-dianthrimide carbazols with alcoholic potassium hydroxide, with chlorosulphonic acid at an elevated temperature and reacting at a temperature up to about 100° C. the compound thus obtained with an excess of dimethyl amine.

9. A process for the production of new vat dyestuffs which comprises treating a member selected from the group consisting of the dyestuffs which may be obtained by condensing Bz 1 - benzanthronyl - 5 - amino-1,1'-dianthrimides with a complex compound of aluminium chloride with a base of the group consisting of amines and ammonia and by condensing Bz 1- benzanthronyl-5-amino-1,1'-dianthrimide carbazols with alcoholic potassium hydroxide, with chlorosulphonic acid at an elevated temperature and reacting at a temperature up to about 100° C. the compound thus obtained with an excess of piperidine.

10. A process for the production of new vat dyestuffs which comprises treating a member selected from the group consisting of the dyestuffs which may be obtained by condensing Bz 1 - benzanthronyl - 5 - amino-1,1'-dianthrimides with a complex compound of aluminium chloride with a base of the group consisting of amines and ammonia and by condensing Bz 1-benzanthronyl-5-amino-1,1'-dianthrimide carbazols with alcoholic potassium hydroxide, with chlorosulphonic acid at an elevated temperature and reacting at a temperature up to about 100° C. the compound thus obtained with an excess of morpholine.

11. A process for the production of new vat dyestuffs which comprises treating a member selected from the group consisting of the dyestuffs which may be obtained by condensing Bz 1 - benzanthronyl - 5 - amino-1,1'-dianthrimides with a complex compound of aluminium chloride with a base of the group consisting of amines and ammonia and by condensing Bz 1-benzanthronyl-5-amino-1,1'-dianthrimide carbazols with alcoholic potassium hydroxide, with chlorosulphonic acid at an elevated temperature and reacting at a temperature up to about 100° C. the compound thus obtained with an excess of 1,2,3,4-tetrahydroquinoline.

References Cited in the file of this patent

UNITED STATES PATENTS

| | | |
|---|---|---|
| 2,029,239 | Kranzlein et al. | Jan. 28, 1936 |
| 2,140,873 | Hanold | Dec. 20, 1938 |
| 2,278,977 | Dettwyler | Apr. 7, 1942 |
| 2,360,010 | Ogilvie | Oct. 10, 1944 |
| 2,426,547 | Buckley et al. | Aug. 26, 1947 |

FOREIGN PATENTS

| | | |
|---|---|---|
| 467,919 | Great Britain | June 25, 1937 |

OTHER REFERENCES

Houben: Das Anthracen Und Die Anthrachinone, pp. 411 and 412, Georg, Thieme/Verlag/Leipzig (1929).